United States Patent
Humphreys et al.

[19]

[11] Patent Number: 5,825,874
[45] Date of Patent: *Oct. 20, 1998

[54] MOBILE TELEPHONE HOLDER

[75] Inventors: Morris R. Humphreys, Saginaw; Ari H. Leman, Euless, both of Tex.

[73] Assignee: Nokia Mobile Phones Limited, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 689,331

[22] Filed: Aug. 9, 1996

[51] Int. Cl.⁶ ...................................................... H04M 1/00
[52] U.S. Cl. ............................................ 379/446; 379/455
[58] Field of Search .................................. 379/446, 454, 379/455, 426, 447, 420; 455/90, 575, 128, 346, 347, 348, 351

[56] References Cited

U.S. PATENT DOCUMENTS

| | | | |
|---|---|---|---|
| D. 327,070 | 6/1992 | Watanabe | D14/251 |
| 4,406,928 | 9/1983 | MacKenzie | 379/454 |
| 4,640,542 | 2/1987 | Watjer et al. | 296/37.8 |
| 4,903,325 | 2/1990 | Yoshitake et al. | 455/89 |
| 4,957,264 | 9/1990 | Hakanen | 248/510 |
| 5,121,863 | 6/1992 | Kotitalo et al. | 224/42.45 R |
| 5,142,573 | 8/1992 | Umezawa | 379/454 |
| 5,179,590 | 1/1993 | Wang | 379/454 |
| 5,187,744 | 2/1993 | Richter | 379/449 |
| 5,189,358 | 2/1993 | Tomura et al. | 320/2 |
| 5,222,132 | 6/1993 | Rioux, Jr. | 379/455 |
| 5,248,264 | 9/1993 | Long et al. | 439/347 |
| 5,256,955 | 10/1993 | Tomura et al. | 320/2 |
| 5,305,381 | 4/1994 | Wang et al. | 379/455 |
| 5,457,745 | 10/1995 | Wang | 379/454 |
| 5,471,530 | 11/1995 | Chen | 379/446 |
| 5,480,115 | 1/1996 | Haltof | 379/455 |

FOREIGN PATENT DOCUMENTS

| | | |
|---|---|---|
| 0121292 | 10/1984 | European Pat. Off. . |
| 0280061 | 8/1988 | European Pat. Off. . |
| 0341395 | 11/1989 | European Pat. Off. . |
| 0506439 | 9/1992 | European Pat. Off. . |
| 0545670 | 6/1993 | European Pat. Off. . |
| 585011 | 3/1994 | European Pat. Off. ............... 379/446 |
| 4015091 | 1/1991 | Germany . |
| 4310600 | 7/1994 | Germany . |
| 3-85949 | 4/1991 | Japan . |
| 2259179 | 3/1993 | United Kingdom . |
| 2268844 | 1/1994 | United Kingdom . |
| 2275582 | 8/1994 | United Kingdom . |

OTHER PUBLICATIONS

Patent Abstracts of Japan, Publication No. JP1067054, Mar. 13, 1989, Kazuyuki.

*Primary Examiner*—Jack Chiang
*Attorney, Agent, or Firm*—Perman & Green, LLP

[57] ABSTRACT

A mobile telephone holder having a frame and a combined latching and ejecting mechanism. The mechanism includes an arm, a spring and a pusher. The arm is pivotably mounted to the frame. The arm has a first end with a latch section and an opposite second end with a push button section. The spring is located between the second end of the arm and the pusher. The pusher is biased by the spring against the frame and has a projection that extends into the telephone receiving area of the frame. A fully inserted telephone moves the pusher.

20 Claims, 9 Drawing Sheets

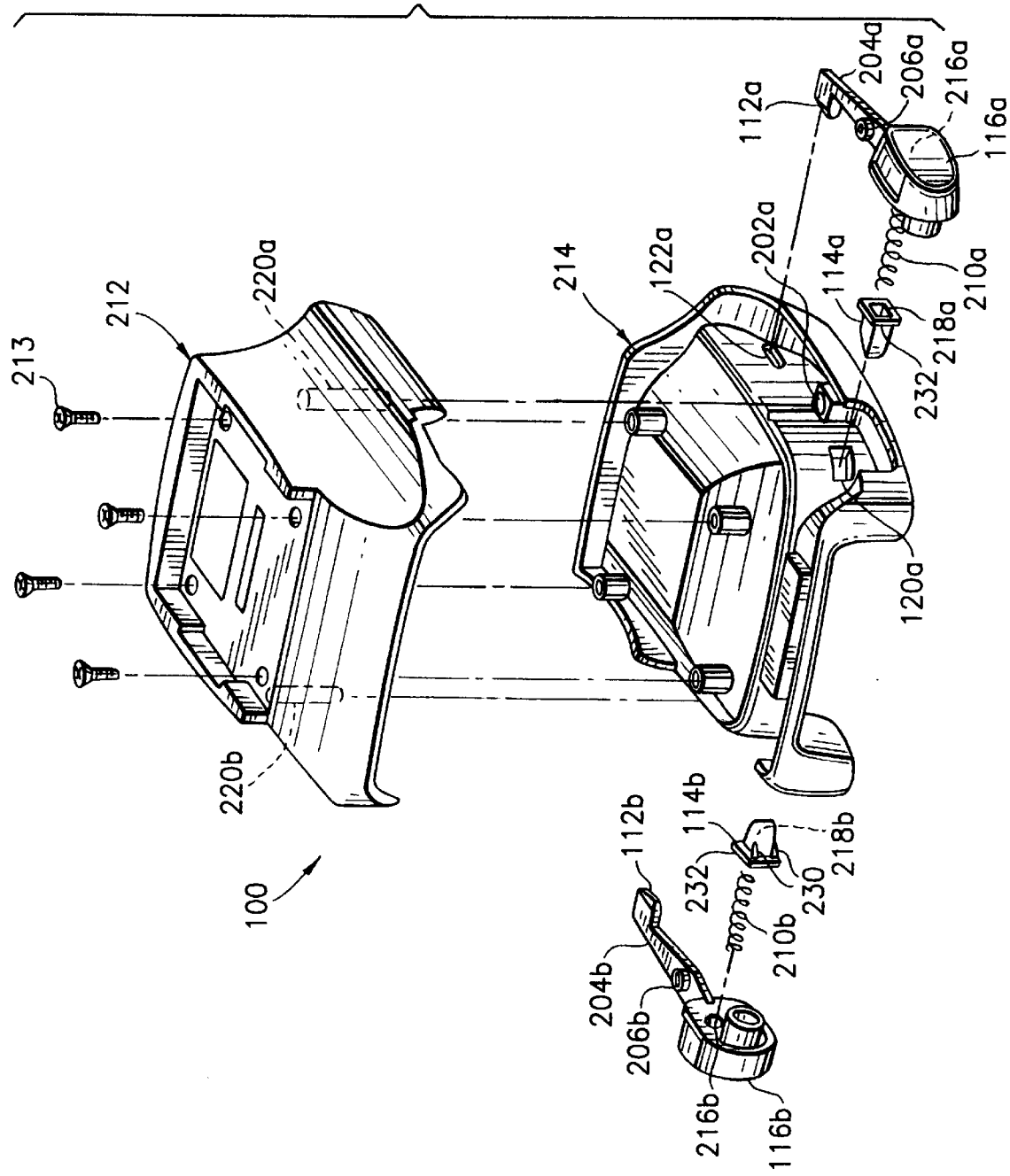

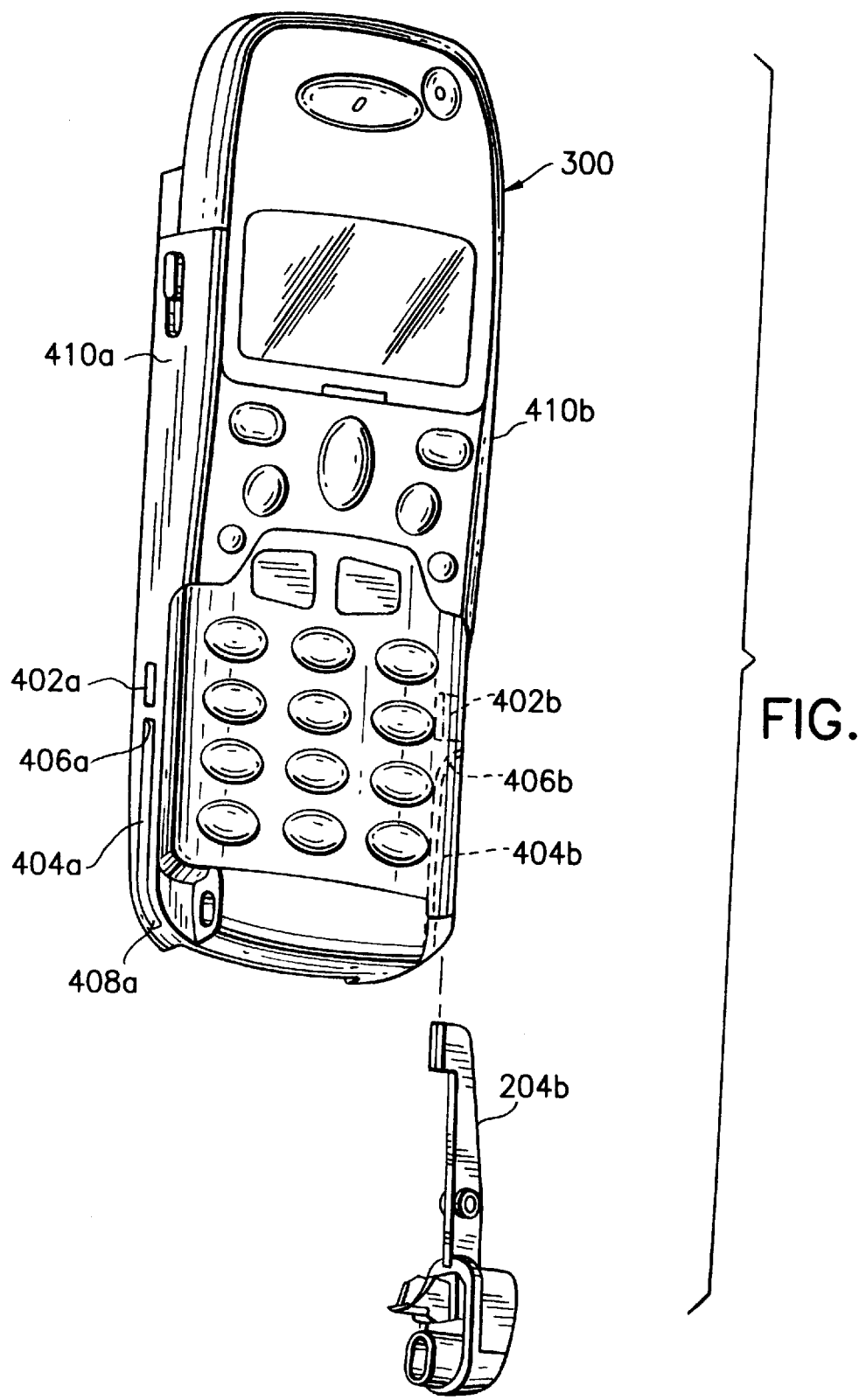

5,825,874

1
MOBILE TELEPHONE HOLDER

BACKGROUND OF THE INVENTION

1. Field of the Invention

This invention relates to mobile telephone holders and, more particularly, to a mobile telephone holder having a clamping mechanism that provides a secure position for the mobile telephone within the holder while allowing easy movement of the mobile telephone from and into the secure position within the holder

2. Prior Art

The number of mobile telephones in use worldwide is rapidly increasing. Since a large percentage of mobile telephones are used within automobiles or other moving vehicles while the user is driving, there is also an increasing interest in the safety aspects of using a mobile telephone within a moving vehicle while driving. One safety aspect related to the use of mobile telephones in vehicles concerns the question of how to easily place and carry the mobile phone securely in a holder within the vehicle, while at the same time allowing the user easy access to the mobile station.

From the user's point of view it is desirable that a mobile phone be securely held in the mobile phone holder during driving and be conveniently, easily, and quickly detachable from the holder with one hand, permitting the user to operate the vehicle with the other. The mobile telephone should also be easily and quickly replaceable back into the holder with one hand, when the user is finished using the mobile telephone. Additionally, it would be an advantage if the holder allowed easy access to the controls and keys of a mobile phone held in the holder, for example when using a handsfree feature. From the manufacturer's point of view, it is also desirable that the holder be capable of providing these advantages, but at the same time be light and simple in construction, allowing quick and easy manufacture, and providing reliability through requiring a minimum number of moving parts.

Present mobile telephone holders may provide one or more of the above listed advantages to a certain degree, but the degree to which each feature is provided may detract from each of the other advantages. For example, the degree to which a mobile holder is light, simple in construction, requires a minimum number of moving parts, and quick and easy to manufacture detracts from the capability to securely hold the mobile telephone in the holder, and at the same time, allow the mobile telephone to be conveniently and quickly detachable from the holder with one hand. On the other hand if a mobile holder is designed to allow convenient and quick detachment from a secure position in the holder, the mechanism needed to realize this may require a relatively large number of different shaped parts that complicate manufacture and reduce reliability.

For example, in the U.S. Pat. Nos. 5,187,744 and 5,121,863 there are two mobile telephone holders disclosed that are indicative of the prior art. The holder disclosed in U.S. Pat. No. 5,121,863 provides a mobile telephone holder that allows the mobile telephone to be detached from, and replaced back into, the holder using one hand. However, the holder requires at least four different size springs and a large number of different sized plastic pieces in the preferred embodiment, which complicates manufacture and assembly. The holder disclosed in U.S. Pat. No. 5,187,744 provides a mobile telephone holder having fewer parts of different shapes then that of U.S. Pat. No. 5,121,863, but does not allow as easy one handed removal of a mobile telephone from the holder because there is no release button. Since there is no release button the mobile telephone must be pulled from the grasp of the spring loaded clamps with force provided by the user.

As such, it would be desirable to provide a mobile telephone holder having a clamping mechanism that securely holds a mobile phone within the holder, and allows easy movement of the mobile telephone from and into the secure position within the holder, while at the same time having a light, simple construction, and a minimal number of different shaped parts.

SUMMARY OF THE INVENTION

The present invention provides a mobile telephone holder having a clamping mechanism that securely holds a mobile telephone within the holder, and allows easy movement of the mobile telephone from and into a secure position within the holder. The clamping mechanism is light, simple in construction, and a minimum number of different shaped parts are needed for implementing the clamping mechanism.

When the user of a mobile telephone desires to secure the mobile telephone in the holder of the present invention, the user simply slides the mobile telephone into the holder. The holder includes guides for positioning the telephone in the holder so that the user may secure the telephone in the holder in a single one-handed motion. Once the mobile telephone has been slid into position, at least one latch of a clamping mechanism automatically secures the mobile telephone into the holder in a locked position. While moving towards the locked position, the mobile telephone displaces at least one pusher of the holder. The displacement of the pusher increases the force exerted by the latch on the telephone. The pusher also exerts a force on the telephone opposing displacement of the pusher. The holder has an open front and the key controls of a mobile telephone are easily accessible, if the user desires to use the mobile while it is secured in the holder, for example, for handsfree use. When the user desires to remove the mobile telephone from the holder, the user may grasp a portion of the holder and press a release mechanism in a one handed grasp. Pressing the release mechanism causes an increase in the upward force on the telephone at the pusher and moves the mobile telephone from the locked position in the holder. This allows the telephone to remain loosely seated in the holder in an un-locked position. The user may then remove the mobile telephone from the un-locked position in the holder when desired. The complete process of pressing the release mechanism and removing the mobile telephone from the holder may be accomplished with a single one-handed motion.

In an embodiment of the invention the mobile telephone holder of the invention utilizes a clamping mechanism that is symmetrical in design, allowing use of identical pieces in the clamping mechanism on each side of the holder. When a mobile telephone is in the locked position in the holder, the mobile telephone is held in place by spring driven latches that apply pressure on opposite sides of the telephone from each side of the holder. The latch on each side of the holder is formed on the end of an arm. The inward pressure at each latch is generated by a spring that causes a rotational force on the arm about a fixed axis. When the mobile telephone is in the locked position the mobile telephone also forces a pusher part into each side of the bottom of the holder. Each pusher part is positioned at the opposite end of one of the springs from an arm of the clamping mechanism. The pressing on the pusher parts increases the compression on the springs of the spring driven clasps, and reinforces the pressure applied to the mobile telephone by each of the spring-driven arms at each of the latches. The compression of the springs also causes the pusher parts to create an upward pressure on the mobile telephone that further secures the mobile telephone in the holder by pushing the phone against the latch with an upward directed force.

The telephone may be released from the holder by pressing release buttons that rotates each arm about a fixed axis in a direction that withdraws each latch from the sides of the mobile telephone. As the arms rotate about the fixed axis and withdraw the latches, this movement also increases the compression on the springs, causing the pusher parts to move the telephone from the secure position in an upward direction out of the holder. The mobile telephone may then be removed easily from the holder with one hand, or left in an un-locked position from which it can be easily removed when so desired.

BRIEF DESCRIPTION OF THE DRAWINGS

A more complete understanding of the present invention maybe had by reference to the following detailed description when read in conjunction with the accompanying drawings wherein:

FIG. 2 is an exploded bottom, left perspective view of the holder shown in FIG. 1A;

FIG. 4 is a perspective view illustrating details of contact points between the mobile telephone and portions of the clamping mechanism of the holder;

DETAILED DESCRIPTION OF THE PREFERRED EMBODIMENTS

Figure 1A:
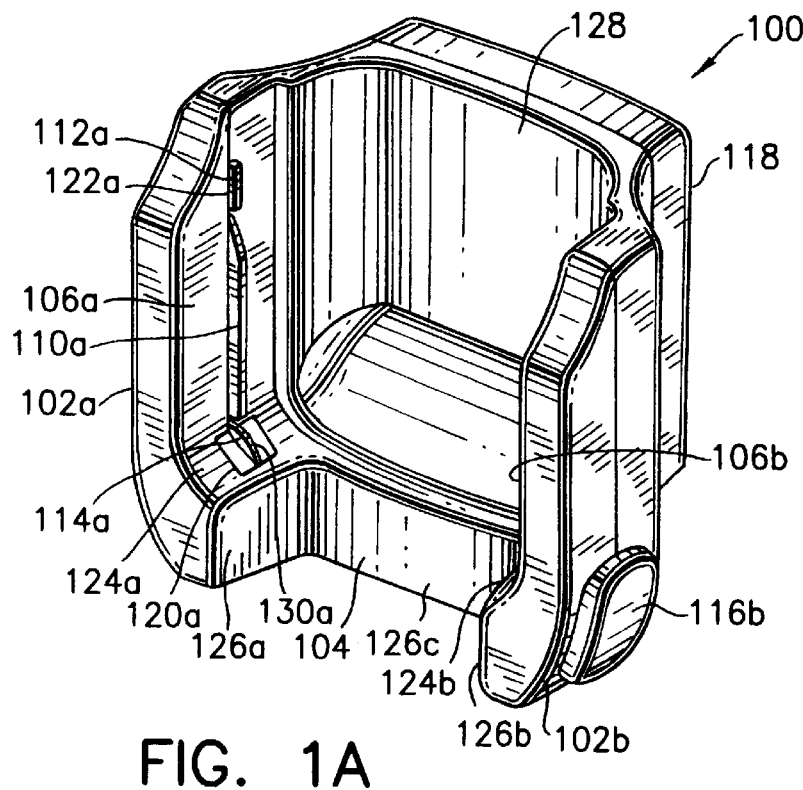
FIG. 1A is a front, right perspective view of a mobile telephone holder incorporating features of the present invention.
Figure 1B:
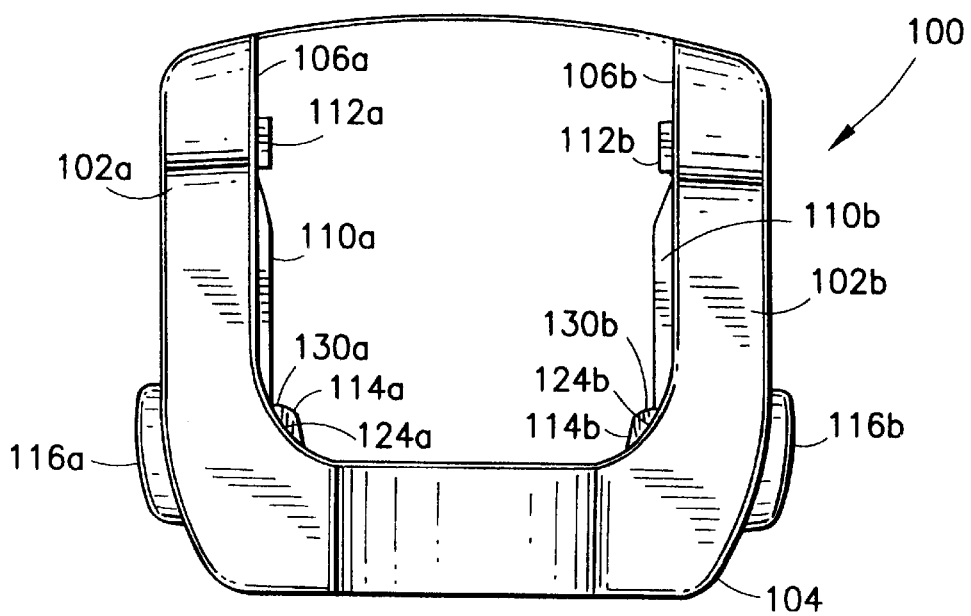
FIG. 1B is a front elevational view of the holder shown in FIG. 1A.

Referring to FIGS. 1A and 1B, a front right perspective view and a front elevational view, respectively, of a mobile telephone holder 100 according to an embodiment of the present invention is shown. Although the present invention will be described with reference to the embodiments shown in the drawings, it should be understood that features of the present invention can be embodied in various different forms of alternate embodiments. In addition, any suitable size, shape or type of elements or materials could be used.

The holder 100 comprises a vertical back portion 118 and a general U-shaped front portion 104. The back portion 118 and the U-shaped front portion 104 form a seat with a receiving area for holding a portion of a portable telephone or telephone handset. The U-shaped front portion 104 has two vertical side portions 102a, 102b. Each vertical side portion 102a, 102b extends perpendicularly along the length of the back portion 118. The vertical side portions 102a, 102b are disposed opposite each other on the back portion 118. The back portion 118 includes a recess 128. The left side portion 102a has an inner surface 106a. The right side portion 102b has an inner surface 106b. The two inner surfaces 106a, 106b are substantially parallel to each other. The two side portions 102a, 102b are spaced from each other so that the distance between the inner surfaces 106a, 106b may accommodate the width of a mobile telephone. The bottom of the U-shaped front portion 104 between the two side portions 102a, 102b is constructed thinner in width then each of the side portions 102a, 102b. This forms a recess having inner surfaces 126a, 126b and 126c. The left side portion 102a comprises the inner surface 106a, a curved surface 124a formed near the bottom of U-shaped portion 104, and a guide 110a formed along the inner surface 106a. The guide 110a runs in a general vertical direction. The right side portion 102b is substantially an identical mirror image of the left side portion 102a. The right side portion 102b has a corresponding inner surface 106b, a curved surface 124b and a guide 110b.

A clamping mechanism for securing a mobile telephone within holder 100 is embodied within each of side portions 102a and 102b. In the embodiment shown, the clamping mechanism in each of the side portions 102a, 102b are configured as substantially identical mirror images to each other. However, in alternate embodiments, the clamping mechanisms need not be substantially identical mirror images. In another alternate embodiment, only one side portion might have a clamping mechanism. The portions of the clamping mechanisms that are visible in FIGS. 1A and 1B comprise a latch 112a, 112b, a pusher 114a, 114b and a release button 116a, 116b. The left latch 112a extends perpendicularly from the surface 106a through a slot 122a. The right latch 112b extends perpendicularly from the surface 106b through a similar slot 122b (see FIG. 5A). The left pusher 114a is located in a slot 120a through the surface 124a in the left side portion 102a. The right pusher 114b is located in a slot 120b through the surface 124b in the right side portion 102b (see FIG. 5A). The pushers 114a, 114b have a general outer curved shape. The side edges of the pushers 114a, 114b follow the contours of their respective slots 120a, 120b when the pushers 114a, 114b are flush with the surfaces 124a, 124b. The pushers 114a, 114b have respective guides 130a, 130b that extend from the pushers. The guides 130a, 130b are essentially the same width as the guides 110a, 110b. The release buttons 116a, 116b extend outward from the outer lateral sides of the side portions 102a, 102b.

Referring also to FIG. 2, an exploded bottom, left perspective view of the mobile telephone holder 100 is shown. The frame or body of the holder 100 has a rear frame piece 212 and a front frame piece 214. The rear frame piece 212 includes two axle receptacles 220a, 220b similar to the axle receptacles 202a, 202b on the front frame piece 214. The receptacles 220a, 220b extend in a direction toward the receptacles 202a, 202b. The two frame pieces 212, 214, when connected to each other by the screws 213, form the back portion 118 and the two side portions 102a and 102b. In alternate embodiments, the frame of the holder could be comprised of more than two frame pieces or, merely comprise one frame piece. The clamping mechanisms each comprise an arm 204a, 204b. In the embodiment shown, the arms 204a, 204b are identical components. However, in alternate embodiments, the arms could be different from each other. The top ends of the arms 204a, 204b have latch sections that form the latches 112a, 112b, respectively. The bottom ends of the arms 204a, 204b have push button sections that form the release buttons 116a, 116b, respectively. The arms 204a, 204b each have a cylindrical axle 206a, 206b. The axles 206a, 206b are located at a point on the arms between their respective latches 112a, 112b and release buttons 116a, 116b. The cylindrical axles 206a, 206b extend generally perpendicular to the length of their respective arms 204a, 204b. The arms 204a, 204b also each include a receptacle 216a, 216b within the release buttons 116a, 116b. The receptacles 216a, 216b are for receiving one end of the respective springs 210a, 210b. The pushers 114a, 114b also each include a receptacle 218a, 218b. The receptacles 218a, 218b are for receiving the other end of the springs 210a, 210b. The holder 100 is assembled by inserting the springs 210a, 210b into the receptacles 216a, 218a and 216b, 218b. The cylindrical axles 206a, 206b are placed into their respective axle receptacles 202a, 202b in the front frame piece 214. The latches 112a, 112b are inserted into the slots 122a, 122b and the pushers 114a, 114b are inserted into the slots 120a, 120b. When the rear frame piece 212 and the front frame piece 214 are brought together, the axle receptacles 220a, 220b engage the cylindrical axles 206a, 206b and cause the arms 204a, 204b to be held between axle receptacles 202a, 202b and 220a, 220b. The springs 210a, 210b force the arms 204a, 204b to pivot about the axles 206a, 206b in the axle receptacle 202a, 202b. This moves the latches 112a, 112b inward into the slots 122a, 122b through the surfaces 106a, 106b. The springs 210a, 210b also force the pushers 114a, 114b into the slots 120a, 120b through the surfaces 124a, 124b. The pushers 114a, 114b each include a pair of stops 230 and a perimeter stop 232 that prevent the pushers 114a, 114b from going completely through slots 120a, 120b. The stops 230, 232 hold the surfaces of the pushers 114a, 114b flush with the surfaces 124a, 124b at the furthest point of extension of pushers 114a, 114b into the slots 120a, 120b.

Figure 3B:
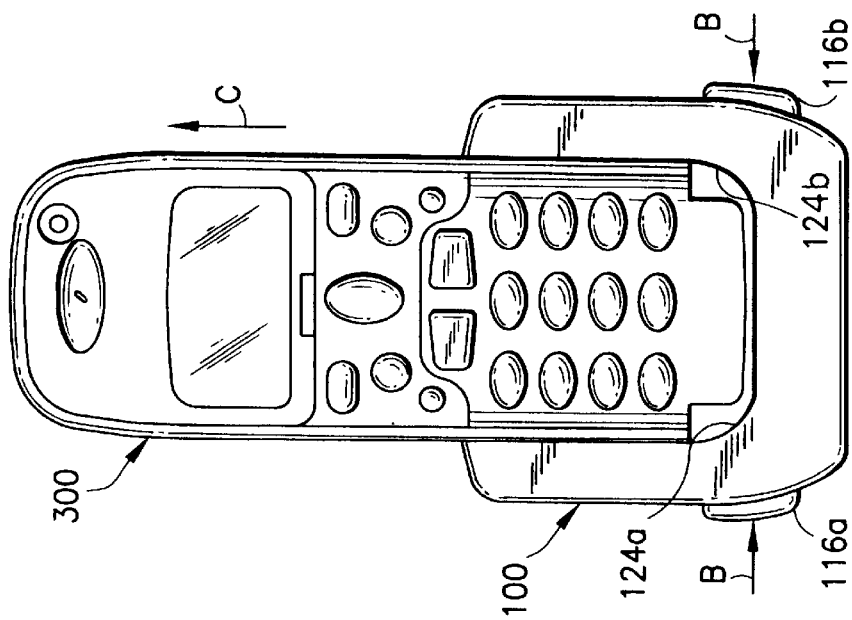
FIG. 3B is a front elevational view as in FIG. 3A with the mobile telephone shown fully inserted into the holder.
Figure 3A:
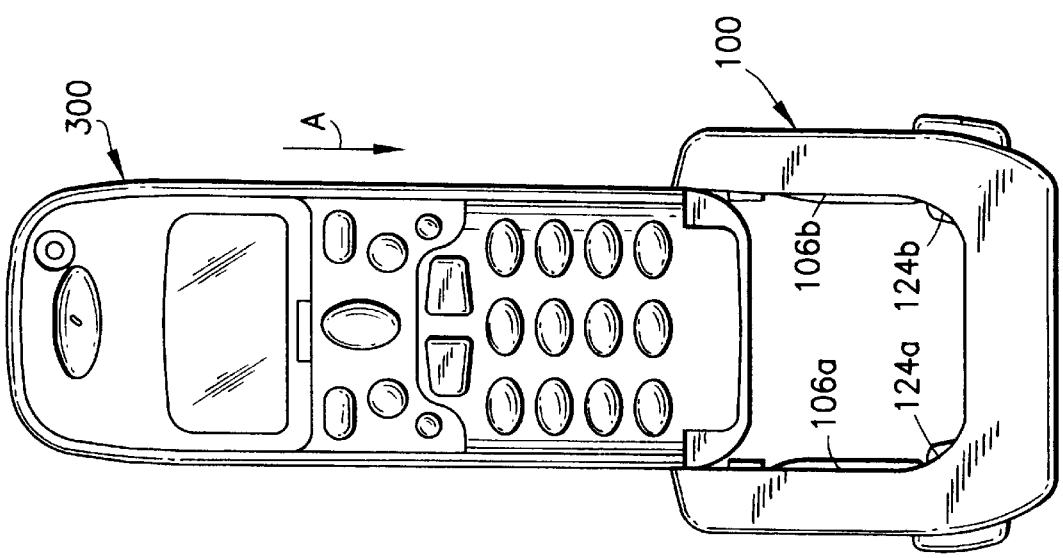
FIG. 3A is a front elevational view of a mobile telephone partially inserted into the mobile telephone holder shown in FIG. 1A.

Referring now to FIGS. 3A and 3B, front elevational views are shown of a mobile or portable telephone 300 partially inserted and fully inserted, respectively, into the mobile telephone holder 100. The mobile telephone 300 is placed in the mobile telephone holder 100 from the top by aligning the mobile telephone 300 with inner surfaces 106a, 106b, as shown in FIG. 3A, and sliding the telephone 300 in a downward direction A, so that the telephone 300 contacts and stops at the curved surfaces 124a, 124b in a fully inserted position, as shown in FIG. 3B. Mobile telephone 300 is removed form holder 100 by pressing release buttons 116a, 116b as indicated by arrow B and sliding the telephone 300 in the upward direction C. It can be seen from FIG. 3B that the controls and keys of mobile telephone 300 are easily accessible while in the holder. The easy accessibility of the controls and keys while mobile telephone 300 is in holder 100 is useful, for example, if it desired to use mobile telephone 300 in a handsfree mode.

Referring now to FIG. 4, a bottom, left perspective view of the front of the mobile telephone 300 and an arm 204b of the clamping mechanism is shown. For clarity of description, only the mobile telephone 300 and right arm 204b are shown. It should be understood, however, that the contact points between mobile telephone 300 and left arm 204a are configured in an similar fashion; the only difference being that the contact points between mobile telephone 300 and left arm 204a are mirror images of those between mobile telephone 300 and right arm 204b. In order to facilitate the insertion, securing, and removal of the mobile telephone 300 in and from the holder 100, the grooves 404a, 404b are provided on the left and right sides 410a, 410b, respectively, of the telephone 300. For the same reason, the notches 402a, 402b are also provided on the outsides 410a, 410b, respectively, of mobile telephone 300. The grooves 404a, 404b are mirror images of each other. The grooves 404a, 404b comprise respective open bottoms 408a, 408b and tapered tops 406a, 406b that runs from the bottoms of grooves 404a, 404b to the outsides 410a, 410b of mobile telephone 300. In alternate embodiments, the holder could be configured to hold other types of telephones, such as a telephone without grooves 404a, 404b.

Figure 5A:
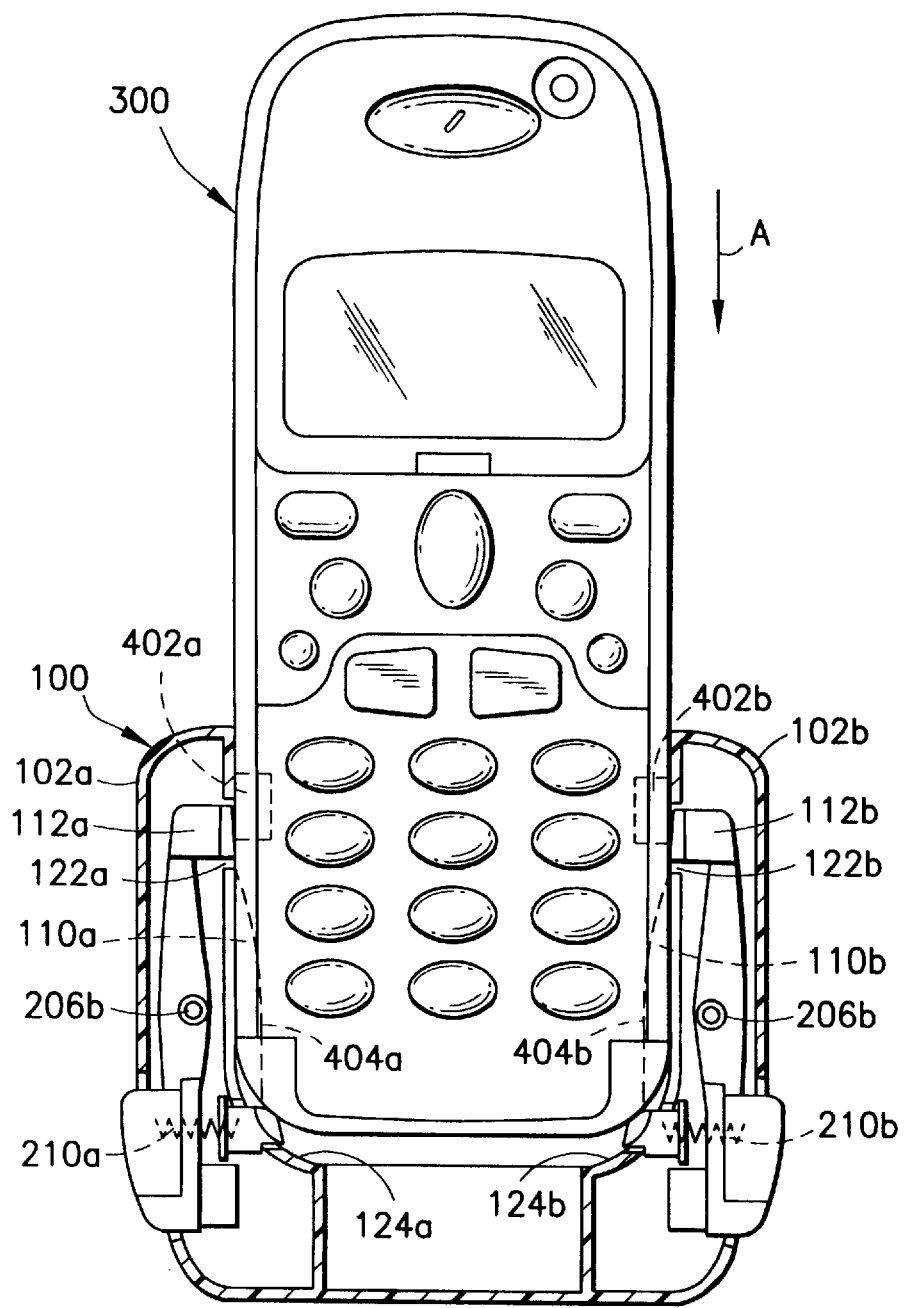
FIGS. 5A–5D are front perspective views of the telephone shown in FIGS. 3A and 3B and a cross-sectional view of the holder illustrating the action of the clamping mechanism of the holder at various positions of insertion and removal.
Figure 5B:
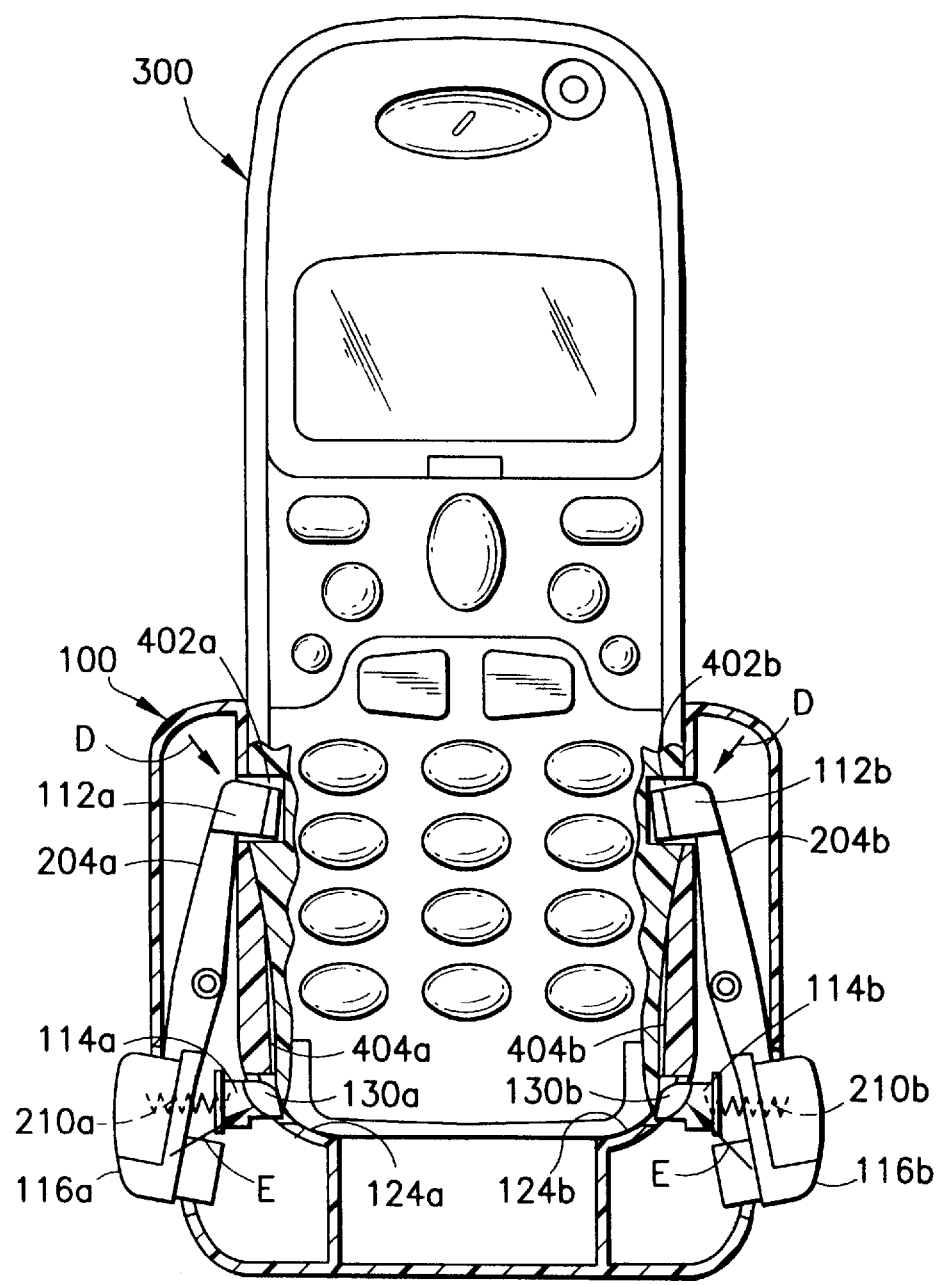

Referring now to FIGS. 5A–5D, front elevational views of the telephone 300 and partial cross-sectional views of the holder 100 are shown illustrating the action of the clamping mechanism at various positions of insertion and removal of the telephone 300. The clamping mechanisms in each of the side portions 102a, 102b function identically to each other. FIG. 5A shows the telephone 300 at a position of being inserted into the holder 100. As the telephone 300 is inserted and slides down along inner surfaces 106a, 106b into the holder 100, the latches 112a, 112b and the guides 110a, 110b engage the grooves 404a, 404b. The tapered tops of grooves 404a, 404b allow the latches 112a, 112b to slide out of the grooves 404a, 404b over the outsides sides 410a, 410b of the telephone 300. The springs 210a, 210b keep the latches 112a, 112b exerting a pressure on the telephone 300 at points of contact. The latches 112a, 112b then snap into the notches 402a, 402b as the telephone 300 comes to rest just above curved surfaces 124a, 124b. FIG. 5B shows the telephone 300 in a locked position in the holder 100. As the telephone 300 comes to rest just above surfaces 124a, 124b, the open ends of grooves 404a, 404b engage the guides 130a, 130b of the pushers 114a, 114b. The guides 130a, 130b extend from the pushers 114a, 114b a distance such that a pressure is exerted on the pushers 114a, 114b causing the pushers 114a, 114b to exert a compression force on the springs 210a, 210b. At the same time, the arms 204a, 204b also exerts a compression force on the springs 210a, 210b caused from the inside of notches 402a, 402b opposing the force of latches 112a, 112b and causing the arms 204a, 204b to rotate and compress the springs 210a, 210b. When the telephone 300 is fully inserted in holder 100, the compression on the springs 210a, 210b causes a clamping force on the telephone 300 exerted from the latches 112a, 112b, and the guides 130a, 103b of the pushers 114a, 114b as indicated by arrows D and E. The telephone 300 is held in the locked position by this clamping force. In alternate embodiments, the forces D and E could be alternatively configured as desired or required by the telephone configuration.

Figure 5C:
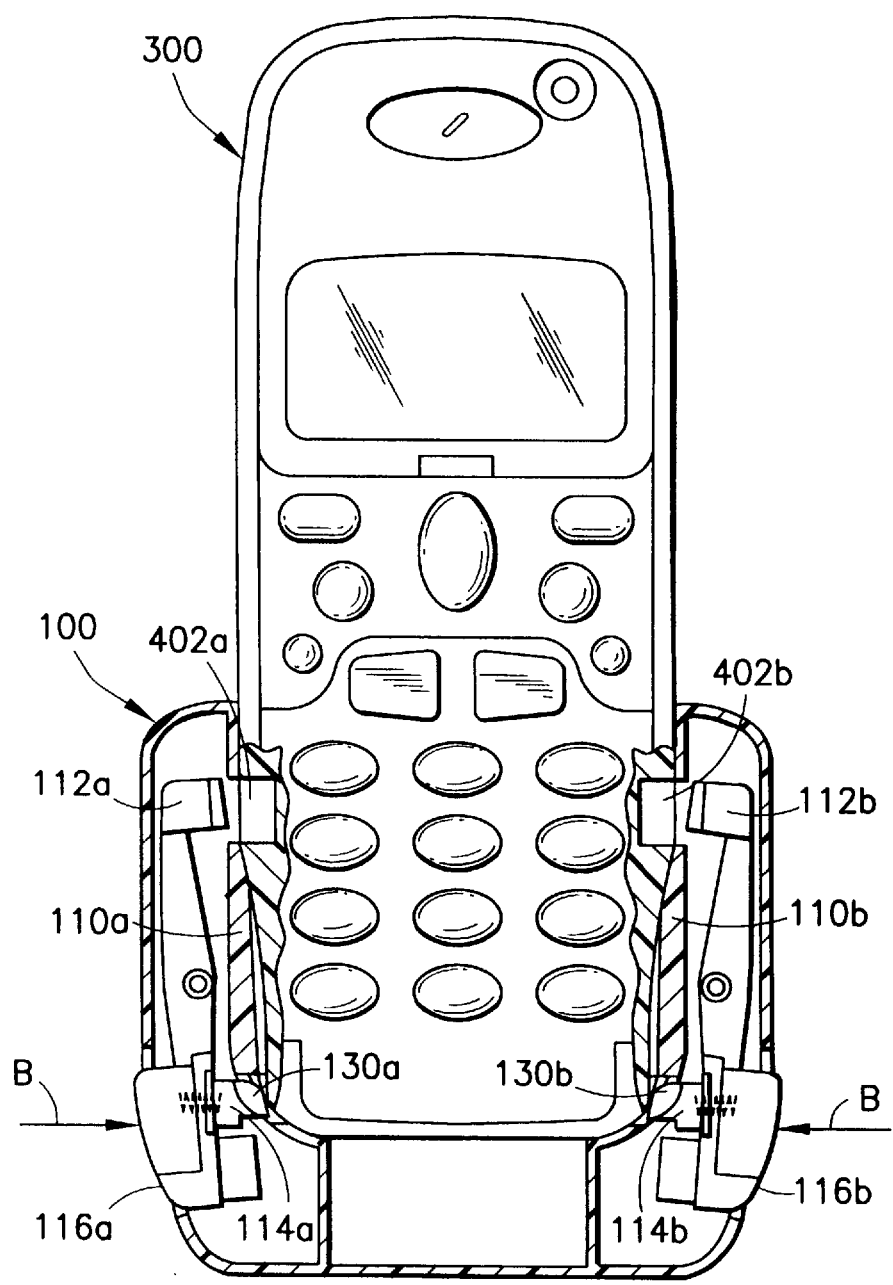
Figure 5D:
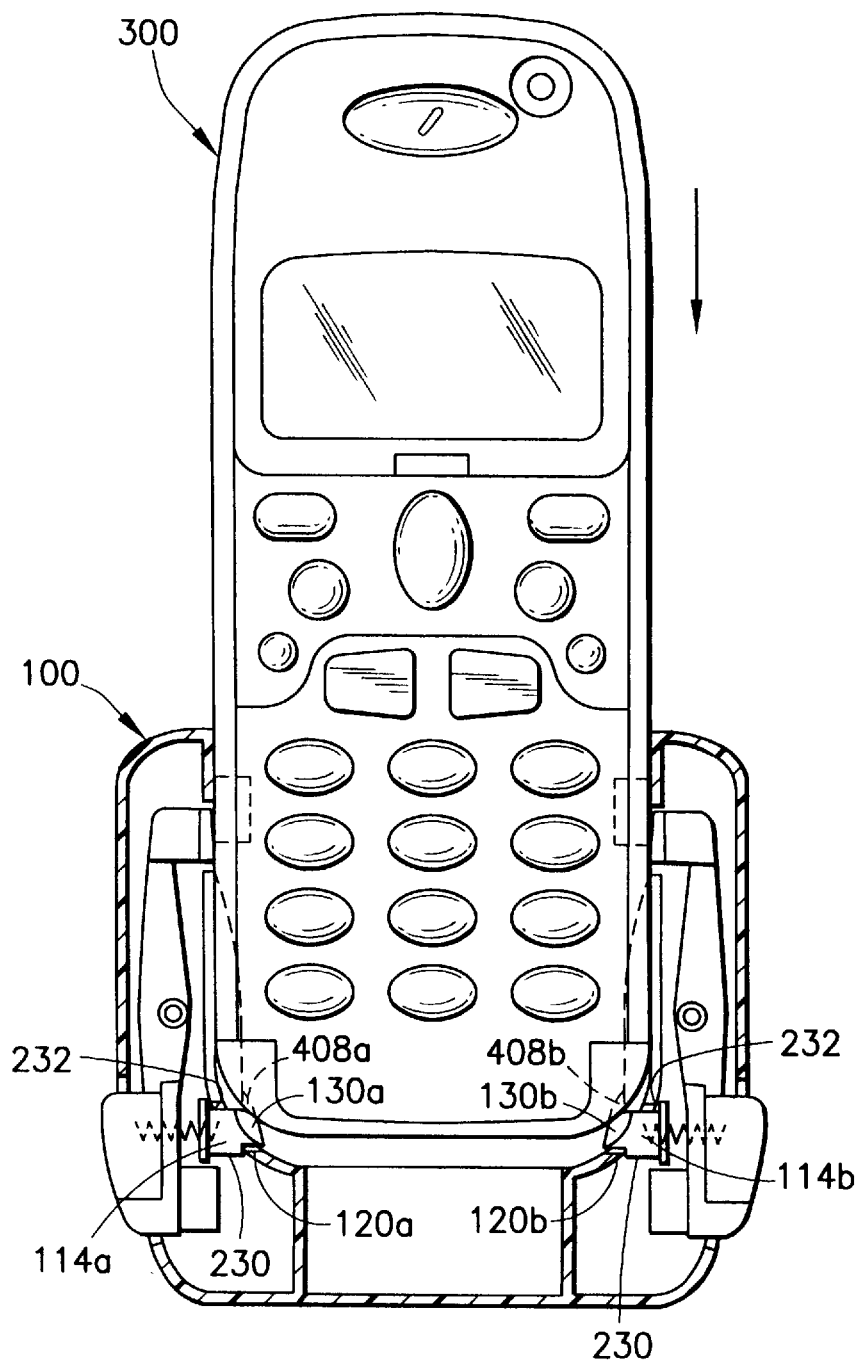

In order to remove the telephone 300 from the holder 100, the user may grasp holder 100 in one hand and simultaneously press each of release buttons 116a, 116b in direction B. FIG. 5C shows the telephone 300 as the release buttons 116a, 116b are being pushed. When the release buttons 116a, 116b are pressed, the latches 112a, 112b disengage from notches 402a, 402b, respectively, and the telephone 300 slides upward along the guides 110a, 110b toward the un-locked position. The pushers 114a, 114b are pressed inward towards each other. The guides 130a, 130b slide along the bottoms 408a, 408b, respectively, of the grooves 404a, 404b, and force the telephone 300 in the upward direction C. FIG. 5D shows the telephone 300 within holder 100 and in the un-locked position. The telephone 300 will come to rest at a position in which the stops 230, 232 of the pushers 114a, 114b stop moving through slots 120a, 120b. In the resting position, the groove bottoms 408a, 408b are just contacting guides 130a, 130b, respectively.

Figure 6:
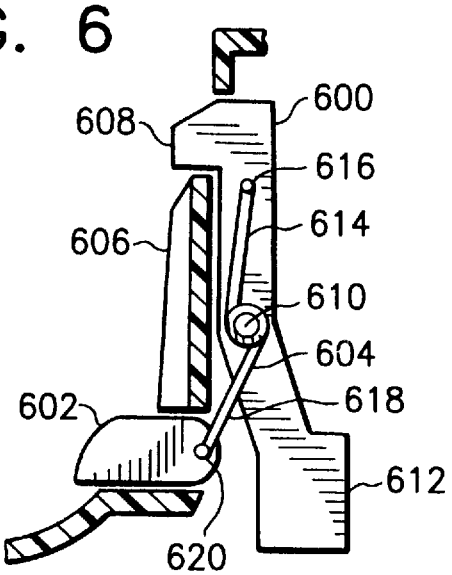
FIG. 6 is a partial schematic cross-sectional view of an alternate embodiment of a clamping mechanism.

Referring now to FIG. 6, an alternate embodiment of the clamping mechanism is shown. In the embodiment shown, the clamping mechanism includes an arm 600, a pusher 602 and a spring 604. The arm 600 is pivotably mounted to the frame 606 of the holder. The arm 600 has a latch section 608, a pivot point 610 and a push button section 612. The spring 604 is wrapped around the pivot point 610. The spring has a top leg 614 attached to the top of the arm 600 at the hole 616 and a bottom leg 618 attached to the pusher 602 at hole 620. This embodiment illustrates that other types of springs and connection of the springs to the arm and pusher could be provided.

Figure 7:
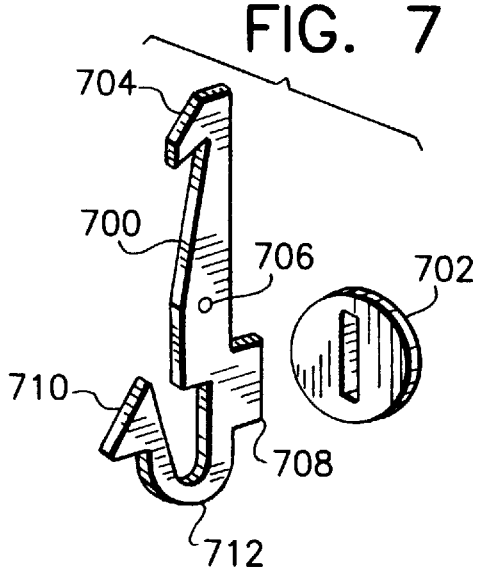
FIG. 7 is a perspective view of another alternate embodiment of a clamping mechanism.

Referring now to FIG. 7, another alternate embodiment of the clamping mechanism is shown. In this embodiment, the clamping mechanism has a combined member 700 and a release knob 702. The combined member 700 has a top latch section 704, a hole 706, a knob mount 708, a pusher section 710 and an integral spring section 712. The member 700 is preferably a one-piece member made of metal or plastic. The hole 706 allows the member 700 to be pivotably mounted to a pivot point on the frame of the holder. The knob mount 708 allows the release knob 702 to be attached to the member 700. The pusher section 710 performs the same functions as the pusher 114a or 114b in the embodiment of FIGS. 1–5. However, the coil spring 210a or 210b has been replaced with the integral spring section 712. The spring section 712 is resiliently deformable to allow the pusher section 710 to move relative to the rest of the member 700 and, biases the pusher section 710 and latch section 704 towards the telephone receiving area of the holder.

Figure 8:
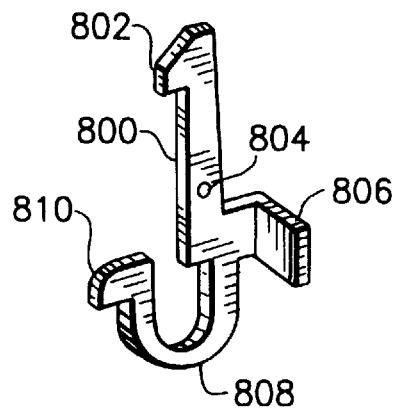
FIG. 8 is a perspective view of another alternate embodiment of a clamping mechanism.

Referring now to FIG. 8, another alternate embodiment is shown. In this embodiment, the clamping mechanism is a single one-piece member 800. The member 800 has a latch section 802, a mounting hole 804, a button section 806, an integral spring section 808, and an integral pusher section 810. Such a one-piece member would be less expensive to manufacture and assemble into a holder.

It should be understood that the foregoing description is only illustrative of the invention. Various alternatives and modifications can be devised by those skilled in the art without departing from the spirit of the invention. Accordingly, the present invention is intended to embrace all such alternatives, modifications and variances which fall within the scope of the appended claims.

What is claimed is:

1. A portable telephone holder comprising:
    a frame having a stationary seat for receiving a portion of a portable telephone; and
    a mechanism mounted to the frame for clamping the telephone in the seat and for pushing, at least partially, the telephone out of the seat without moving the seat, wherein the mechanism comprises a pusher section connected to a user actuated push button section by a spring section, wherein the user actuated push button section is adapted to be depressed by a user in a direction into a push button hole in the frame for pushing the telephone out of the seat.

2. A holder as in claim 1 wherein the frame has two opposing side portions, at least one side portion having a stationary rail guide on an inner surface.

3. A holder as in claim 2 wherein the frame has two holes through the inner surfaces of the at least one side portion, a first one of the holes being located below and aligned with a portion of the rail guide and a second one of the holes being located above and aligned with the portion of the rail guide.

4. A holder as in claim 2 wherein both opposing side portions have rail guides that face each other.

5. A holder as in claim 1 wherein the mechanism includes a first arm, the spring section comprising a first spring and the pusher section comprising a first pusher, wherein portions of the arm and the pusher extend into a telephone receiving area of the seat and the spring is located between the arm and the pusher.

6. A holder as in claim 5 wherein the arm is pivotably mounted to the frame with a latch section at a first end extending into the receiving area and the spring being connected to an opposite second end of the arm.

7. A holder as in claim 6 wherein the second end of the arm has the push button section that extends outward from the frame.

8. A holder as in claim 5 wherein the mechanism comprises a second arm, a second pusher and a second spring mounted to the frame on an opposite side of the frame from the first arm, first pusher and first spring.

9. A holder as in claim 1 wherein the mechanism includes a one-piece member with a latch section, the pusher section and the spring section therebetween.

10. A holder as in claim 9 wherein the one-piece member further comprises the push button section being integral therewith for a user to move the member.

11. A holder as in claim 1 wherein the mechanism includes a one-piece member with the pusher section, the push button section for a user to move, and the spring section being integral between the pusher section and the push button section.

12. In a portable telephone holder having a frame with a seat for receiving a portion of a portable telephone, and an arm movably mounted to the frame, the arm having a first end with a latch and a second end with a push button section, wherein the improvement comprises:
    a pusher movably mounted to the frame, the pusher being movable relative to the seat and extending into a telephone receiving area of the seat, the pusher being spring loaded against the frame by a spring located between the pusher and the second end of the arm and wherein the seat is stationarily located on the frame.

13. A holder as in claim 12 wherein the pusher has a projecting guide section that extends into the telephone receiving area.

14. A holder as in claim 13 wherein the frame has a rail guide located above the pusher and, the rail guide and the projecting guide section have substantially the same thickness.

15. A holder as in claim 14 wherein the holder has two pushers on opposite sides of the receiving area and two rail guides; one above each pusher.

16. A holder as in claim 14 wherein the latch extends into the telephone receiving area above the rail guide.

17. A holder as in claim 12 wherein the holder has two pushers.

18. A method of mounting a portable telephone to a holder comprising steps of:
    moving a latch section of a movable arm of the holder out of a telephone receiving area of the holder, at least partially, during insertion of the telephone into the telephone receiving area of the holder; and
    moving the latch section of the arm back into the receiving area and into a hole in the telephone at a fully inserted position of the telephone in the receiving area, wherein a pusher is connected to the arm by a spring and the pusher is moved out of the receiving area, at least partially, by physical contact with the telephone when the telephone is moved towards its fully inserted position such that the pusher exerts force on the spring which exerts force on the arm to bias the latch against the telephone in the hole at the fully inserted position, wherein the step of moving the latch section out of the receiving area comprises pivotally moving the arm with a push button section of the arm moving in a direction into a push button hole in a frame of the holder towards the pusher and the spring being compressed between the push button section and the pusher.

19. A method as in claim 18 wherein the pusher is partially received in a groove on the telephone when the telephone is in the fully inserted position.

20. A method as in claim 18 further comprising guiding the telephone during insertion into the holder by guides, extending from the frame of the holder, being received in grooves along opposite lateral sides of the telephone.

* * * * *